United States Patent

[11] 3,624,499

[72] Inventors David R. Smith
 McKeesport, Pa.;
 Alvin Y. Broverman, Crystal Springs, Miss.
[21] Appl. No. 76,541
[22] Filed Sept. 29, 1970
[45] Patented Nov. 30, 1971
[73] Assignee Westinghouse Electric Corporation
 Pittsburgh, Pa.

[54] ELECTRICAL TRANSFORMER WITH ZERO SEQUENCE VOLTAGE INDICATOR
 8 Claims, 3 Drawing Figs.
[52] U.S. Cl. .................................................... 324/86,
 317/18 D, 324/108, 340/255
[51] Int. Cl. ........................................................ G01r 25/00
[50] Field of Search ............................................. 336/5, 10,
 12, 214, 215; 324/86, 108; 317/18 R, 18 D

[56] References Cited
 UNITED STATES PATENTS
| | | | |
|---|---|---|---|
| 1,535,588 | 4/1925 | Evans | 324/86 X |
| 2,068,575 | 1/1937 | Stank | 324/86 X |
| 2,922,972 | 1/1960 | Gordy | 336/5 X |
| 3,504,318 | 3/1970 | Wilburn et al. | 336/215 X |
| 3,509,507 | 4/1970 | Specht | 336/215 X |

Primary Examiner—Thomas J. Kozma
Attorneys—A. T. Stratton, F. E. Brosder and D. R. Lackey ABSTRACT: A three-phase electrical transformer of the core-form type including wye-wye connected primary and secondary windings having grounded neutrals. The magnetic core has three winding legs for the primary and secondary windings, and at least one additional leg. An auxiliary winding is disposed on the additional leg and connected to indicating means which provides a signal when the voltage induced into the auxiliary winding by zero sequence flux flowing through the additional leg reaches a predetermined magnitude.

PATENTED NOV 30 1971

3,624,499

WITNESSES:
Bernard R. Gieguay
James F. Young

INVENTORS
David R. Smith and
Alvin Y. Broverman.
BY
Donald R. Lackey
ATTORNEY

ELECTRICAL TRANSFORMER WITH ZERO SEQUENCE VOLTAGE INDICATOR

BACKGROUND OF THE INVENTION

1. Field of the Invention

The invention relates in general to electrical transformers, and more specifically to three-phase transformers of the core-form type, having grounded wye-wye connected primary and secondary windings.

2. Description of the Prior Art

Three-phase electrical transformers of the core-form type for pad mounting, wherein the primary supply voltage is connected to the transformer via underground shielded cables, presents a circuit which may give rise to ferroresonance. When the primary windings of the transformer are sequentially switched with single-phase cutouts, a point is reached during the switching sequence where flux is flowing in the winding leg of an open circuited winding, due to one or both of the other phases being energized. The inductive reactance of the open circuited winding is effectively connected in series circuit relation with the ground capacitance of the shielded cable connected thereto, and the voltage induced into the open circuited winding due to the flux flowing therethrough from the energized phase, or phases, may give rise to overvoltages due to ferroresonance occurring in the series circuit.

The problem of ferroresonance may be obviated, or at least minimized within acceptable limits, by connecting both the primary and secondary windings of the transformer in wye, and by grounding their neutral points. The grounded neutral of the wye connection short circuits the resonant reactances, and minimizes the probability of ferroresonance.

The grounded wye-wye connection of the transformer, however, provides a path for zero sequence currents to flow during unbalanced load conditions, open phase conditions, or during line-to-ground faults. Since the zero sequence fluxes flowing in the three core legs are in phase, some provision must be made to provide a return path for the zero sequence flux. Otherwise, it will be forced outside of the magnetic core, into the end frames of the core and into the tank walls, which may cause serious heating of these components.

Disposing conventional tertiary windings on each winding leg and connecting them in a delta configuration, is not a satisfactory or economical solution in the usual pad-mount installation. The zero sequence impedance of this delta connected tertiary winding, with respect to the other windings, will usually be so low that the magnitude of the zero sequence current flowing upon the occurrence of a fault located between the primary windings of the transformer and the electrical generator or power source, may cause one or more of the transformer primary fuses to blow, instead of clearing the fault solely with the protective apparatus designed for this purpose at the source. Designing the tertiary winding to have the proper impedance would be costly, and therefore an undesirable solution to the problem.

For these reasons, it is conventional to utilize either a five-legged magnetic core structure with a three-phase core-form pad mounted transformer, or, as disclosed in copending applications Ser. Nos. 787,863, now U.S. Pat. No. 3,509,507 and 824,376, now U.S. Pat. No. 3,504,318, filed Dec. 30, 1968 and May 7, 1969, respectively, a four-legged magnetic core may be used to advantage over a five-legged magnetic core. With either type of core, the primary and secondary windings are connected in wye and grounded. With a five-legged core, the three intermediate legs are the winding legs, and the two outer legs provide return paths for any zero sequence flux which flows in the winding legs of the core. With a four-legged magnetic core, any three legs may be used for winding legs and the remaining leg provides a return path for any zero sequence flux. The reluctance of the additional leg, or legs, to the flow of the zero sequence flux is low enough to prevent the flux from leaving the magnetic core and establishing a return path through the core, end frames, and tank walls. The zero sequence impedance will be high enough to limit the magnitude of the zero sequence current and prevent the transformer fuses from blowing upon a line-to-ground fault located between the power source and the transformer primary winding.

The presence of zero sequence flux in the additional leg, or legs, of the magnetic core signifies an unbalanced load, an open phase, or a fault condition, and when the zero sequence flux exceeds a magnitude considered excessive, the electrical utility would profit from knowledge thereof. It would be desirable to learn of open phases and fault conditions before being reported by customers of the utility, and it would also be desirable to learn of the presence of unbalanced loading and/or intermittent faults which do not cause complete outages, to enable the electrical utility to take the necessary corrective action, if this intelligence could be generated without requiring costly additional apparatus. For example, potential transformers may be connected from each phase to ground to provide signals which may be used to indicate open phases and fault conditions, but the cost of this approach outweighs the benefits obtained.

SUMMARY OF THE INVENTION

Briefly, the present invention is a three-phase transformer of the core-form type having grounded wye-wye connected primary and secondary windings, and a magnetic core with three winding legs for the primary and secondary windings, and one or two additional legs. In the embodiment of the invention having one additional leg, an auxiliary winding is disposed on the additional leg and connected to indicating means which provides a signal when the magnitude of the flux in this leg reaches a predetermined magnitude. Since there will be no flux in the fourth leg unless there is an unbalance, any flux in this leg is the zero sequence flux from the three winding legs. The indicating means may provide a signal at the transformer, or it may generate a signal which is transmitted back to the central station, or both, as desired.

In the embodiment of the invention having two additional legs, i.e., a five-legged core, an auxiliary winding is disposed on each additional leg and serially connected such that zero sequence fluxes in these two legs provide additive voltages in the serially connected windings. Normal flux in these legs will cancel in the serially connected windings, thus providing a voltage indicative of the magnitude of the zero sequence flux flowing in the winding legs. The two serially connected windings are connected to indicating means, similar to the four-legged embodiment of the invention.

BRIEF DESCRIPTION OF THE DRAWINGS

Further advantages and uses of the invention will become more apparent when considered in view of the following detailed description of exemplary embodiments thereof, taken with the accompanying drawings, in which.

DESCRIPTION OF PREFERRED EMBODIMENTS

Figure 1:
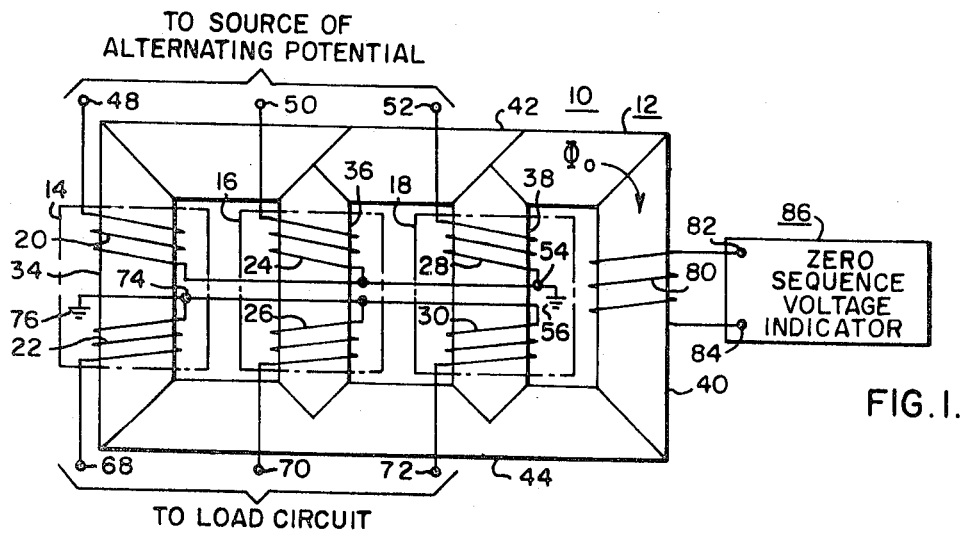
FIG. 1 is an elevational view of a three-phase transformer of the core-form type, constructed according to a first embodiment of the invention.

Referring now to the drawings, and FIG. 1 in particular, there is shown a three-phase transformer 10 constructed according to the teachings of the invention. Transformer 10 includes a magnetic core structure 12, shown in an elevational view, and winding phases 14, 16 and 18 shown generally in dotted outline, each having primary and secondary windings, which are shown schematically. Phase 14 includes primary and secondary windings 20 and 22, respectively, phase 16 includes primary and secondary windings 24 and 26, respectively, and phase 18 includes primary and secondary windings 28 and 30, respectively. Transformer 10 is of the three-phase, core-form type, with its primary and secondary windings being connected in a grounded wye-wye configuration.

Magnetic core 12 includes first, second and third winding leg members 34, 36 and 38, and an additional leg member 40, all disposed in spaced parallel relation, having their ends joined by upper and lower yoke members 42 and 44, respectively. Leg members 34, 36, 38 and 40 are each formed of a plurality of stacked metallic, magnetic laminations, such as silicon, cold-rolled electrical steel, having at least one preferred direction of magnetic orientation. The ends of the laminations which make up the first winding leg member 34, and the additional leg member 40, may have their ends cut diagonally, for example, at an angle of 45° with respect to the longitudinal dimension of the lamination, and the ends of the laminations which make up the second and third winding leg members 34 and 36 may be cut form "spear points," with two diagonal cuts at each end.

For purposes of example, the additional or fourth leg member 40 is disposed outside of the winding leg members, i.e., at one end of the magnetic core, such as adjacent winding leg member 38, as shown in FIG. 1, but it may be disposed between any two winding leg members, if desired. Unlike leg members 34, 36 and 38, leg member 40 does not have power windings disposed thereon.

The upper and lower yoke members 42 and 44, respectively, are constructed of a plurality of layers of metallic, magnetic laminations similar to the leg members 34, 36, 38 and 40, with each layer having one or more laminations. The ends of the outer laminations of both the upper and lower yoke members are cut diagonally to match the diagonal cuts on the laminations of the outer leg members 34 and 40. Each layer of laminations of the upper and lower yoke members 42 and 44 also contains an appropriate notch or indentation formed by two adjacent laminations, or cut in the side of a single lamination, which matches the spear points of the two intermediate leg members 36 and 38.

The joints formed in each layer of laminations between the various leg and yoke members may be offset from similar joints in succeeding layers in a predetermined stepped-lap pattern, as disclosed in U.S. Pat. No. 3,153,215, which is assigned to the same assignee as the present application, or any other suitable joint arrangement may be used, such as the butt-lap configuration.

Leg members 34, 36 and 38, and the portions of the upper and lower yoke members 42 and 44 which join them, are dimensioned the same as they would be in a conventional three-legged magnetic core of the same rating, with the width W of the leg members being the same. The additional leg member 40 is shown as having the same width W as the winding legs 34, 36 and 38, which is its maximum width. System conditions may make it possible to reduce the width of the additional leg member 40, but since it will facilitate manufacturing to use the same lamination width for all leg members, for practical purposes it will usually have the same width W as the winding leg. As shown in FIG. 1, the yoke laminations have the same width W as the winding leg laminations. However, yoke widening may be used when necessary to increase the yoke dimension between the outer sides of the yoke members and the ends of the spear points of the intermediate leg members 36 and 38.

The remainder of the magnetic core 12 from winding leg 38 to leg 40 is different than the conventional three-legged magnetic core, with this portion of the upper and lower yoke portions being lengthened in order to accommodate the fourth leg member 40, and provide a window for receiving the winding on winding leg member 38.

The primary and secondary windings are connected in a grounded wye-wye configuration, with the primary winding including phase winding sections 20, 24 and 28 disposed about winding legs 34, 36 and 38, respectively. Phase winding sections 20, 24 and 28 have one end connected to terminals 48, 50 and 52, respectively, which are adapted for connection to a three-phase source of alternating potential, and the other ends of the phase winding sections are connected in common at neutral terminal 54, which is grounded at 56.

The secondary winding includes phase winding sections 22, 26 and 30, which are disposed about winding leg members 34, 36 and 38, respectively. Phase winding sections 22, 26 and 30 have one end connected to terminals 68, 70 and 72, respectively, which are adapted for connection to a three-phase load circuit, and their other ends are connected in common at neutral terminal 74, which is grounded at 76.

While the primary and secondary phase winding sections on each winding leg are shown axially spaced apart, they will usually be disposed in concentrically adjacent, spaced relation.

Pad mounted power transformers connected into the electrical system via underground shielded cables present ferroresonance problems due to the capacitance of the shielded cable to ground. The incidence of ferroresonance is substantially reduced by connecting the windings in a grounded wye-wye configuration, as shown in FIG. 1. This connection of the windings, however, provides a path for zero sequence currents to flow during unbalanced load conditions, open phase conditions, and during fault or short circuit conditions, and thus some provision should be made for the zero sequence flux.

For balanced three-phase loading, the vector sum of the three phase-to-ground voltages and therefore of their fluxes, is equal to zero at any instant. Thus, during normal loading conditions, the additional leg member 40 carries no flux. When the vector sum of the three pahse-to-ground voltages at the transformer is not zero, a zero sequence component of the flux flows in each winding leg, and these components are all in phase. The zero sequence components of the flux thus flow through the fourth or additional leg member 40. The flux $\Phi_0$ flowing in leg 40 is, therefore, directly proportional to the total zero sequence flux flowing in the magnetic core 12, and is proportional to an unbalance caused by unbalanced loading, line-to-ground faults, or an open phase.

According to the teaching of the invention, an auxiliary winding 80 is disposed about the additional leg 40, which winding develops a voltage across its ends proportional to the magnitude of any zero sequence flux flowing through leg 40. Winding 80 is connected to input terminals 82 and 84 of a zero sequence voltage indicating means 86. The zero sequence voltage indicating means 86 may be of any desired type, such as a visual or audio alarm at the transformer site, or a signal may be developed which is transmitted or relayed back to the central station such as via the power lines, telephone lines and the like. If the signal is transmitted back to the central station, each transformer may have a different frequency signal, on order to identify which transformer location is providing the signal.

Figure 2:
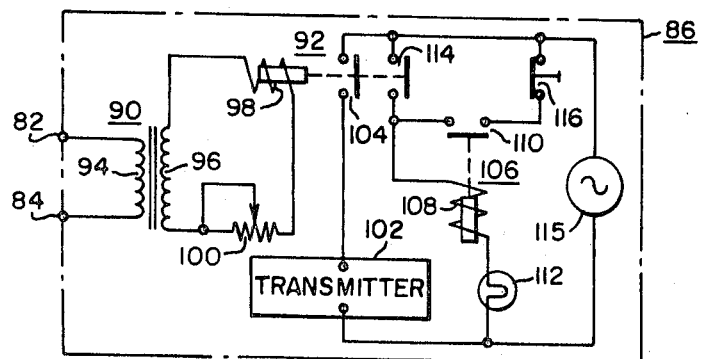
FIG. 2 is a schematic diagram of zero sequence voltage indicating means which may be used to provide a local and remote indication of zero sequence flux.

FIG. 2 is a schematic diagram of zero sequence voltage indicating means which may be used for the means 86 shown in FIG. 1. The means utilized by the electrical utility will depend upon the specific requirements of the utility. More specifically, voltage indicating means 86 may include a step-up transformer 90 having a ratio which will provide the necessary voltage to operate a relay 92 when the zero sequence flux reaches a predetermined magnitude. Since zero sequence voltages will be developed for even small unbalances in transformer loading, it would not be desirable to provide a signal as soon as flux appears in leg 40. Thus, the circuit should be arranged to provide an indication when a certain percentage of the maximum zero sequence flux is flowing. The maximum zero sequence flux would occur when the voltage of one phase collapses entirely, so transformer 90 should be selected to operate relay 92 at some predetermined percentage of this maximum voltage, such as 15 to 20 percent thereof. Step-up transformer 90 has a primary winding 94 connected to input terminals 82 and 84, and a secondary winding 96 connected across the electromagnetic coil 98 of relay 92. An adjustable resistor 100 may be connected to provide an adjustment on the pickup point of relay 92.

If it is only desirable to transmit a signal back to the central station, a suitable transmitter 102 may be connected in series with a normally open contact 104 of relay 92 and a source 115 of potential, such as the alternating current source illustrated, or a direct current source, such as a battery. When relay 92 picks up, contact 104 closes and transmitter 102 provides a signal as long as the condition which caused the excessive zero sequence flux persists. If it is desirable to provide an indication at the transformer site that the transformer has been subjected to a condition which caused excessive zero sequence flux, even though the condition no longer exists, it will be necessary to provide an additional relay which will seal in the signal means and provide a continuous signal until the circuit is reset. In this instance, a relay 106 is provided having an electromagnetic coil 108 and a normally open contact 110, and means for providing a visual signal, such as an electric light bulb 112. The electromagnetic coil 108 and light bulb 112 are connected across source 115 via a normally open contact 114 of relay 92. Contact 110 of relay 106 and a normally closed reset pushbutton 116 are serially connected across contact 114. Thus, when relay 92 is energized and its contact 114 closes, the electromagnetic coil 108 of relay 106 will be energized and the light bulb 112 will be connected to the source 115. Relay 106 seats itself into the circuit via its contact 110, and the light bulb 112 will remain energized even after relay 92 drops out, until the reset pushbutton 116 is actuated to open the circuit through electromagnetic coil 108 of relay 106.

If a signal proportional to the zero sequence flux is transmitted back to the central station via the transmitter 102, it will not usually be required to provide a visual signal at the transformer site, but both types of signal means are illustrated in FIG. 2 for purposes of example. When only a visual signal at the transformer site is required, it will not be of any benefit to the utility when a complete phase is lost, or a fault occurs which operates the associated protective apparatus, but this type of signal indication will provide useful information to the utility for those conditions which are undesirable, but which do not cause a complete outage, such as unbalanced loads or intermittent faults on a transformer, which conditions should be known by the electrical utility in order for them to provide corrective action and prevent future discontinuity in their service.

Figure 3:
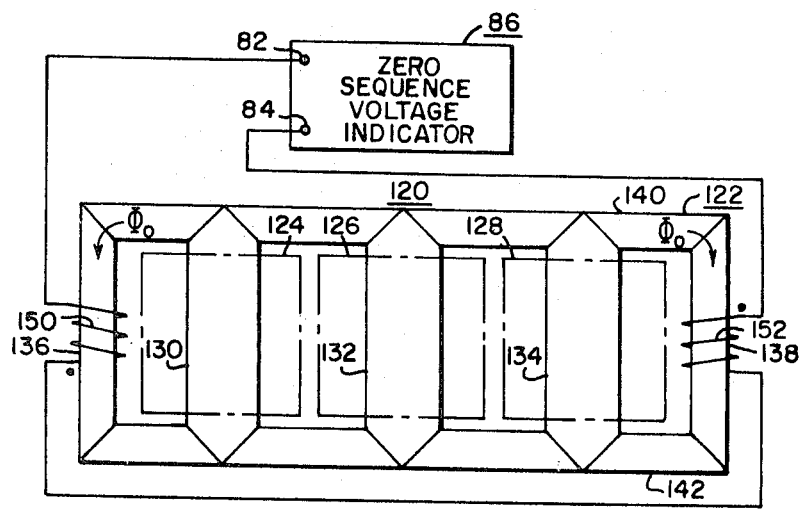
FIG. 3 is an elevational view of a three-phase transformer of the core-form type constructed according to another embodiment of the invention.

FIG. 3 is an elevational view of a transformer 120 constructed according to another embodiment of the invention. Transformer 120 is a three-phase transformer of the core-form type having a magnetic core 122 and phase windings 124, 126 and 128, but instead of a four-legged core, a five-legged magnetic core is used. The phase windings are illustrated only in dotted outline in FIG. 3, as they each have primary and secondary windings connected in the grounded wye-wye configuration, as shown in FIG. 1.

More specifically, as shown in FIG. 3, magnetic core 122 has three intermediate winding leg members 130, 132 and 134, which receive the phase winding sections 124, 126 and 128, respectively. Magnetic core 122 also has first and second outer leg portions 136 and 138, and upper and lower yoke portions 140 and 142, respectively. The yoke portions 140 and 142 join the ends of the spaced parallel leg portions, forming windows for receiving the windings disposed on the winding legs. The winding legs have a dimension W, similar to the winding legs of the magnetic core 12 shown in FIG. 1, but the outer leg members 136 and 138 and upper and lower yoke members 140 and 142 usually have a width dimension equal to about one-half of the winding leg width.

Unlike the four-legged magnetic core shown in FIG. 1, the additional legs 136 and 138 on the five-legged magnetic core 140 have flux flowing therein during normal balanced loading of the three phases. However, the zero sequence flux flowing in the two outer legs 34 and 40 during an unbalanced circuit condition may still be detected by disposing first and second auxiliary coils 150 and 152 on legs 136 and 138, respectively, and connecting the coils or windings such that the voltage picked up due to the zero sequence fluxes are additive. The voltages induced into the auxiliary windings 150 and 152 due to flux other than the zero sequence flux cancels one another, when the windings are connected to add voltages due to the zero sequence flux, thus providing a voltage across the two serially connected coils 150 and 152 which is directly proportional to the total zero sequence flux in the magnetic core. Auxiliary windings 150 and 152 are connected to the input terminals 82 and 84 of the zero sequence voltage indicating means 86, as hereinbefore described relative to FIGS. 1 and 2.

In summary, there has been disclosed new and improved three-phase transformer arrangements of the core-form type, having grounded wye-wye connected primary and secondary windings, and a magnetic core having either four or five legs. The arrangements include means for providing an indication of any zero sequence flux flowing in the magnetic core. Since the zero sequence flux is proportional to the vector sum of the three phase-to-ground voltages at the transformer, providing a signal when the zero sequence flux reaches a magnitude considered undesirable, identifies unusual loading and/or fault conditions. Thus, the electrical utility, upon being notified of the condition by the zero sequence voltage indicating means, may take the necessary corrective action before the unusual condition causes an interruption in service.

We claim as our invention:

1. A three-phase transformer of the core-form type, comprising:
   a magnetic core having first, second and third winding leg members,
   a first additional leg member,
   first and second yoke members disposed to connect the ends of said first, second and third winding leg members, and said first additional leg member,
   first, second and third phase winding assemblies disposed in inductive relation with said first, second, and third winding leg members, respectively, said first, second and third phase winding assemblies including primary and secondary windings connected in a grounded wye-wye configuration,
   a first auxiliary electrical winding disposed about said first additional leg member, which produces a voltage responsive to the magnitude of zero sequence flux flowing therethrough,
   and indicating means connected to said auxiliary electrical winding which provides a signal when the zero sequence flux flowing in said first additional leg member reaches a predetermined magnitude.

2. The three-phase transformer of claim 1 including a second additional leg member, and a second auxiliary winding disposed about said second additional leg member, with the first and second additional leg members being disposed at opposite ends of the magnetic core, the first and second auxiliary windings being serially connected to add voltages induced therein responsive to zero sequence flux, said serially connected first and second auxiliary windings being connected to the indicating means.

3. The three-phase transformer of claim 1 wherein the first additional leg member is disposed at one end of the magnetic core.

4. The three-phase transformer of claim 1 wherein the first additional leg member is disposed between two of the winding leg members.

5. The three-phase transformer of claim 1 wherein the signal provided by the indicating means persists until reset.

6. THe three-phase transformer of claim 2 wherein the signal provided by the indicating means persists until reset.

7. The three-phase transformer of claim 1 wherein the signal provided by the indicating means is transmitted to a point remote from the transformer.

8. The three-phase transformer of claim 2 wherein the signal provided by the indicating means is transmitted to a point remote from the transformer.

* * * * *